United States Patent [19]

Hauser et al.

[11] 4,148,589
[45] Apr. 10, 1979

[54] CEMENT MIXER HAVING A GUARD FOR GEARS

[75] Inventors: Hans Hauser; Jon A. Violet, Fredericktown, Ohio

[73] Assignee: The J. B. Foote Foundry Co., Fredericktown, Ohio

[21] Appl. No.: 805,923

[22] Filed: Jun. 13, 1977

[51] Int. Cl.² .................... F16P 1/00; G05G 25/00
[52] U.S. Cl. ........................ 366/60; 74/609; 74/612
[58] Field of Search ............... 74/609, 608, 611, 612; 366/54, 55, 60, 57, 62, 58, 63, 59

[56] References Cited

U.S. PATENT DOCUMENTS

| 833,848 | 10/1906 | Rundlett | 74/609 X |
| 1,207,829 | 12/1916 | Zech | 74/609 |
| 1,409,261 | 3/1922 | Tomblin | 74/608 |
| 1,581,492 | 4/1926 | Rybeck | 366/62 |
| 1,681,141 | 8/1928 | Terhune | 74/609 |
| 1,697,333 | 1/1929 | Turnbull | 74/414 |
| 1,734,051 | 11/1929 | Schuler et al. | 74/609 |
| 2,438,555 | 3/1948 | Gilson | 366/60 |
| 2,453,583 | 11/1948 | Muller | 366/60 |
| 2,494,119 | 1/1950 | Essick | 366/60 |
| 2,507,077 | 5/1950 | Williams | 366/60 |
| 3,768,785 | 10/1973 | Susemihl | 366/60 |

FOREIGN PATENT DOCUMENTS 8354 of 1908 United Kingdom ..................... 74/609

Primary Examiner—Leslie Braun
Attorney, Agent, or Firm—Allen D. Gutchess, Jr.

[57] ABSTRACT

A gear guard is provided and specifically a guard for a pinion gear which meshes with a larger gear. The guard is specifically designed for use with a cement mixer and includes a U-shaped portion extending around part of the pinion gear and an elongate portion extending therefrom along a ring gear on the mixing drum in a direction from the U-shaped portion opposite to the direction in which the ring gear rotates.

4 Claims, 5 Drawing Figures

CEMENT MIXER HAVING A GUARD FOR GEARS

This invention relates to a guard for gears and the like and specifically to a finger guard for a ring gear and pinion of a cement mixer.

A small cement mixer commonly includes a main frame which pivotally supports a drum yoke with a mixing drum rotatably mounted on the yoke. A circular gear rack or ring gear is affixed to a central portion of the drum in circumjacent relationship with respect thereto. A pinion gear is located at one of the pivots for the drum yoke and meshes with the ring gear for any pivotal position of the yoke.

The pinion gear and ring gear heretofore generally have been open and presented a substantial hazard to workmen. Some attempts have been made to provide finger guards for these gears. However, the guards cannot be placed sufficiently close to the circular ring gear to prevent any possibility of fingers being inserted between the guard and the gear. Consequently, a finger could be partially inserted between the gear and the guard and then be pulled further in and abraded by the moving ring gear. The guard cannot be placed sufficiently close to the ring gear to prevent any possibility of the insertion of the finger because the ring gear is not made with sufficiently close tolerances to enable close placement of the guard. Even if such close tolerances were achieved in the construction of the mixer, the ring gear may be bent during the hard usage that cement mixers receive and would then contact the guard when rotating.

The present invention provides a unique gear guard which has a U-shaped portion encircling part of the pinion gear and an elongate portion extending therefrom along the ring gear in a direction from the U-shaped portion opposite to the direction of rotation of the ring gear. The elongate portion is spaced sufficiently far from the ring gear that fingers can be inserted fully therebetween and yet the spacing exceeds the thickness of most fingers so that injury to the fingers will not result. In addition, the elongate portion is of a length exceeding the length of most fingers so that the fingers cannot reach the pinion gear or, specifically, the point of meshing of the pinion gear with the ring gear.

It is, therefore, a principal object of the invention to provide an improved finger guard for gears.

Another object of the invention is to provide a finger guard for a ring gear and a pinion gear.

A further object of the invention is to provide a finger guard for a gear and pinion with the guard preventing a finger from being caught between the gear and the guard.

Yet another object of the invention is to provide a finger guard for a ring gear and pinion gear with the guard including a portion encircling part of the pinion gear and a portion extending along the ring gear and spaced therefrom by a distance exceeding the thickness of most fingers, with the latter portion also having a length exceeding the length of most fingers.

Many other objects and advantages of the invention will be apparent from the following detailed description of a preferred embodiment thereof, reference being made to the accompanying drawings, in which.

Figure 1:
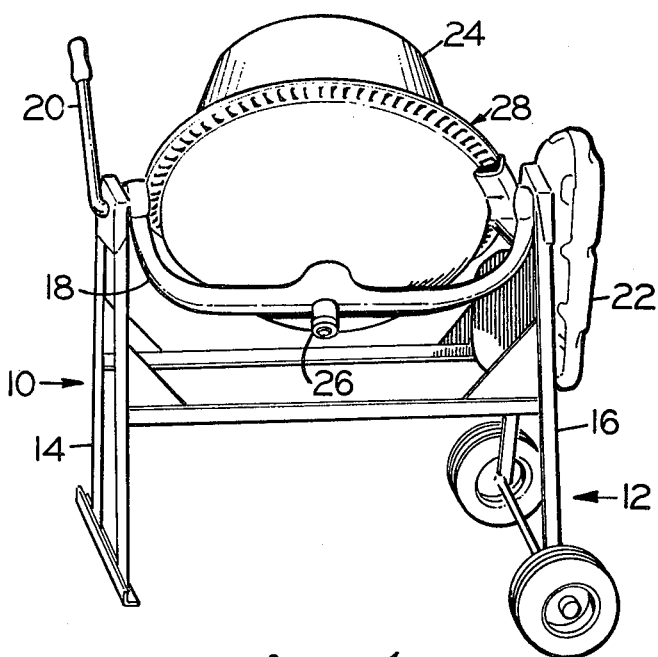
FIG. 1 is a somewhat schematic view in perspective of a cement mixer embodying the invention.

Referring particularly to FIG. 1, a small cement mixer as used by small contractors and home owners is indicated at 10. Typically, the mixer has a capacity of from one-half to five cubic yards and is designed to be moved about, either by hand or by vehicle. The cement mixer 10 includes a main frame 12 having end frames 14 and 16 which pivotally support a drum yoke 18. At the end frame 14, the end of the yoke has a pivot axle connected to a crank arm 20 which can be manipulated to pivot the yoke 18. At the end frame 16, the end of the yoke 18 is pivotally supported on a drive shaft 21 which is rotatably carried in the upper end of the end frame 16 and has a driven sheave (not shown) located within a motor housing 22. The sheave is engaged by a V-belt which is driven by a drive sheave located in a lower portion of the housing 22. A motor in the housing 22 is supported through a portion of the frame and rotates the drive sheave.

A mixing drum 24 is rotatably mounted on an intermediate, horizontal portion of the yoke 18 by means of a bearing and axle assembly 26. A circular ring gear 28 is circumjacent an intermediate portion of the mixing drum 24 and is affixed thereto, as by welds. The ring gear 28 can be made of heavy sheet metal and has gear teeth openings 30 formed therein by bending up lips 32 from the plane of the gear. The gear also has an outer stiffening flange 34 therearound for additional rigidity.

Figure 2:
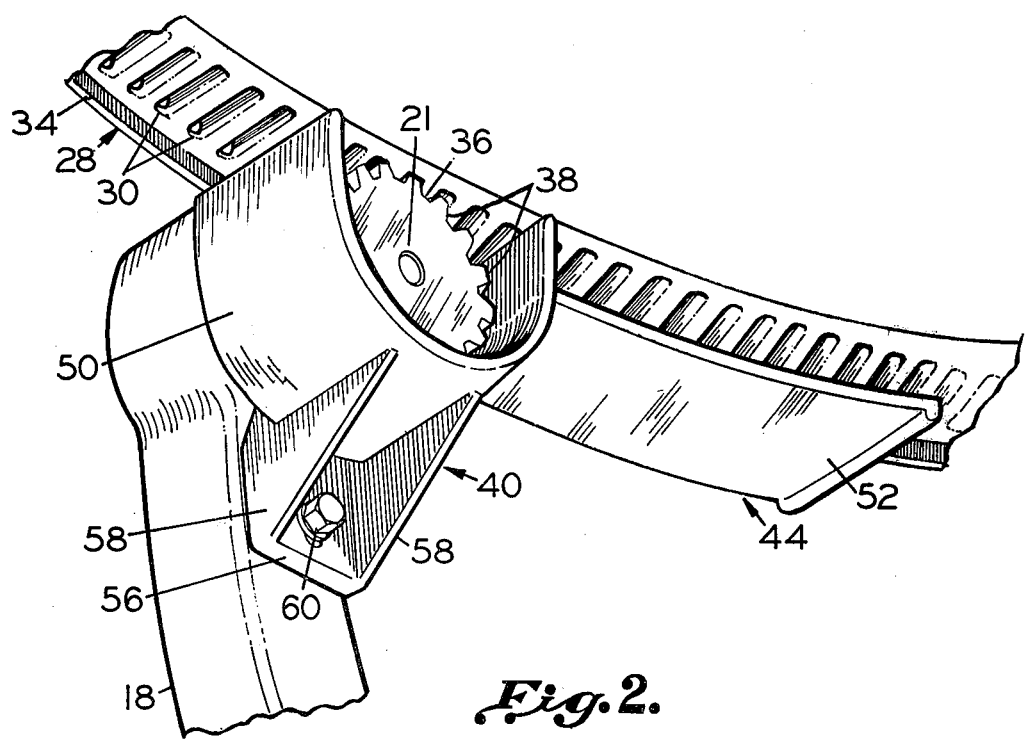
FIG. 2 is an enlarged, fragmentary view in perspective of a finger guard according to the invention assembled with parts of the cement mixer of FIG. 1.
Figure 3:
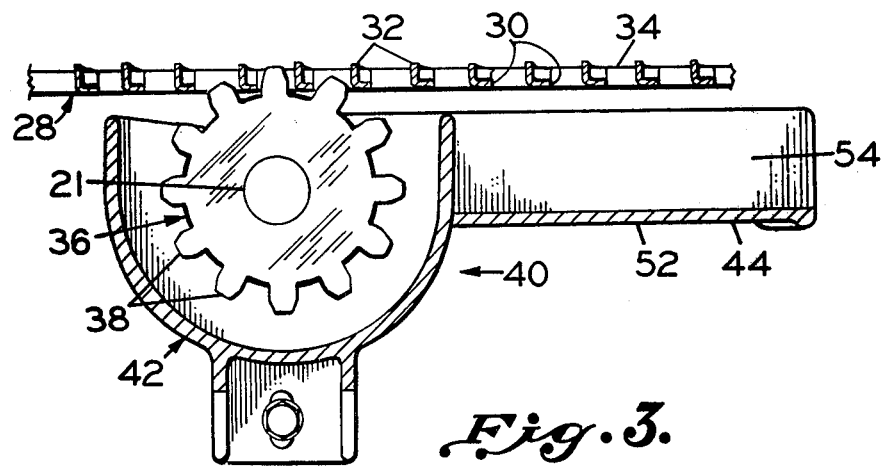
FIG. 3 is a view in section of the finger guard and certain drive components of the cement mixer.

As shown in FIGS. 2 and 3, a pinion gear 36 is affixed to the drive shaft 21 on the side of the end frame 16 opposite the motor housing 22. The pinion gear 36 has teeth 38 which mesh with the gear 28 and specifically extend into the gear teeth openings 30 of the ring gear. The pinion gear 36 and the ring gear 28 heretofore have presented a substantial hazard to workmen or anyone else that is around the mixer, including children. While some attempts have been made to place guards around the pinion and ring gear, they have not been successful and have sometimes produced more of a hazard than no guard at all. The guards cannot be placed sufficiently close to the ring gear to prevent the possibility of a finger being inserted between the gear and the guard. Consequently, one could partially insert a finger therebetween and then have it pulled further in as the ring gear rotates, causing abrasion or worse to the finger. The guard cannot be placed sufficiently close to the ring gear to prevent the possibility of the insertion of the finger due to the fact that the ring gear is not made with sufficiently close tolerances to enable such close positioning of the guard. Even if the gear were so manufactured, it frequently will be bent partly out of shape during the hard usage the mixer receives. Consequently, the guard must always be placed sufficiently far from the ring gear to clear the gear even if it wobbles during rotation.

A gear guard embodying the invention is indicated at 40 and is designed so that a finger cannot be injured between the guard and the gears. The guard 40 basically includes a U-shaped portion 42 which fits around or encircles a substantial portion of the pinion gear 36 and an elongate portion 44 extending therefrom in the direction opposite the direction in which the ring gear 28 rotates or moves. The U-shaped portion includes an outer wall 46 which is located between the pinion gear 36 and the end of the yoke 18 and has a notch 48 which receives the drive shaft 21. A U-shaped transverse wall 50 extends toward the mixing drum 24 from the outer wall 46 and is of a width exceeding the width of the pinion gear 36. The wall 50 can extend quite close to the intermediate portion of the mixing drum 24 below the ring gear 28 because the dimensions of the drum are closely held and it is not as vulnerable to damage as is the ring gear.

The elongate portion 44 includes a generally horizontal extending, arcuate wall 52 and a curved vertical wall or flange 54. The horizontal wall 52 is positioned below the ring gear 28 and is spaced therefrom a distance exceeding the thickness of most fingers. The length of the horizontal wall 52 also exceeds the length of most fingers. With this arrangement, then, one can insert a finger between the wall 52 and the ring gear 28 and it will not be abraded and tend to be pulled toward the pinion gear 36 during the rotation of the ring gear 28. The curved vertical wall 54 also prevents a finger from being inserted close to the U-shaped wall 50 of the U-shaped portion 42 and possibly being carried between the upper end of that wall and the ring gear. The upper end of the U-shaped wall 50 on the side of the pinion gear 36 in the direction of rotation of the ring gear 28 does not present a problem since the gear 28 will tend to push out fingers inserted there.

Figure 4:
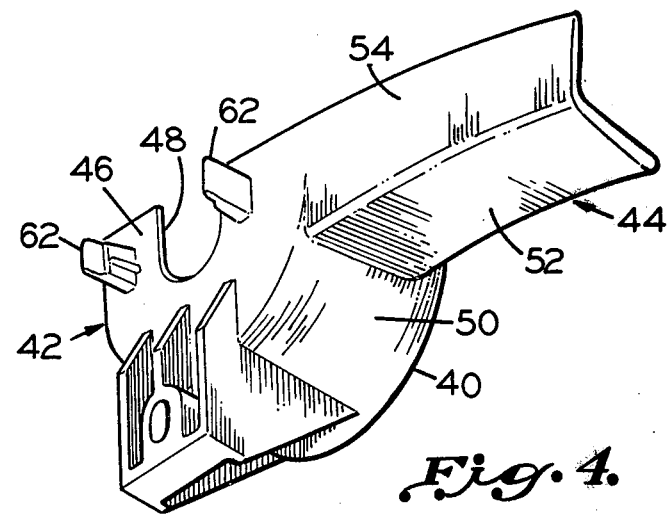
FIG. 4 is a lower view in perspective of the finger guard.
Figure 5:
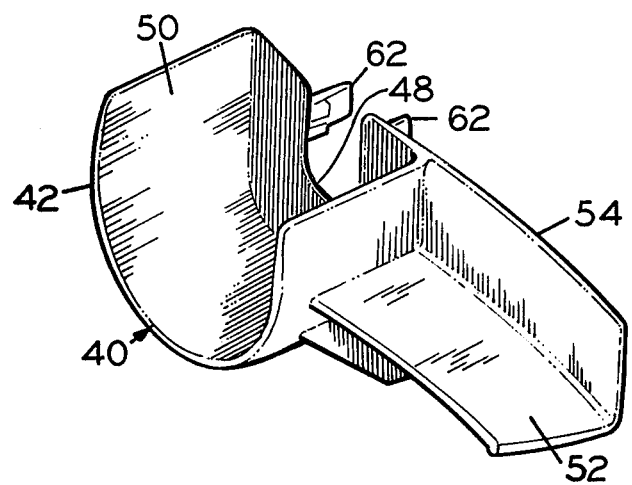
FIG. 5 is an upper view in perspective of the finger guard.

The finger guard 40 can be mounted by means of a single fastener. For this purpose, the guard has a mounting flange 56 extending downwardly from the U-shaped portion 42 with two stiffening flanges 58. The mounting flange 56 is affixed to an upper portion of the yoke 18 by a single bolt 60. The guard 40 is also held in position by a pair of positioning ears 62 (FIG. 4) extending outwardly from the notched wall 46 of the U-shaped portion 42. These ears 62 engage the upper end of the yoke 18 around the portion through which the drive shaft 21 extends.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. In a cement mixer having a frame, a yoke pivotally carried by said frame, a drum rotatably carried by said yoke, said drum having a circumjacent ring gear extending therearound, a drive shaft rotatably carried by one of said yoke pivots, and a pinion gear mounted on said shaft and meshing with said ring gear, the improvement comprising a finger guard comprising a U-shaped portion encircling a portion of said pinion gear on the side opposite said ring gear, said U-shaped portion having a wall with a notch therein receiving said shaft, said notched wall having a pair of ears engageable with said yoke near said drive shaft, said finger guard further comprising an elongate portion affixed to said U-shaped portion and having a wall extending therefrom in a direction opposite to the direction of rotation of said ring gear, means on said guard for affixing said guard to said yoke to position said wall of said elongate portion near said ring gear, said wall of said elongate portion being arcuate with the radius of curvature being substantially equal to the radius of said ring gear.

2. The improvement according to claim 1 characterized by said elongate portion having a curved flange extending from an edge of said arcuate wall toward said ring gear.

3. The improvement according to claim 1 characterized by said U-shaped portion having a mounting flange extending therefrom to be affixed to said yoke.

4. In a cement mixer having a frame, a yoke pivotally carried by said frame, a drum rotatably carried by said yoke, said drum having a circumjacent ring gear extending therearound, a drive shaft rotatably carried by one of said yoke pivots, and a pinion gear mounted on said shaft and meshing with said ring gear, the improvement comprising a finger guard comprising a U-shaped portion encircling a portion of said pinion gear on the side opposite said ring gear, said U-shaped portion having a wall with a notch therein receiving said shaft, said notched wall having means engageable with the yoke near said drive shaft, and an elongate portion affixed to said U-shaped portion and having an arcuate wall extending therefrom in a direction opposite to the direction of rotation of said ring gear, means on said guard for affixing said guard to said yoke to position said arcuate wall near said ring gear but spaced therefrom, said arcuate wall being planar and having a radius of curvature substantially equal to the radius of said ring gear, and a flange extending from an outer edge of said wall toward said ring gear a distance sufficient to substantially bridge the gap between said wall and said ring gear, said flange being curved with a radius of curvature being substantially equal to the radius of said ring gear.

* * * * *